US006966339B2

United States Patent
Oniduka et al.

(10) Patent No.: US 6,966,339 B2
(45) Date of Patent: Nov. 22, 2005

(54) SPOOL VALVE ARRANGEMENT

(75) Inventors: Toshiki Oniduka, Miyoshi-machi (JP); Tsuyoshi Watanabe, Miyoshi-machi (JP); Tsutomu Sawada, Saitama-ken (JP)

(73) Assignee: Iwaki Co., Ltd., Tokyo (JP)

( * ) Notice: Subject to any disclaimer, the term of this patent is extended or adjusted under 35 U.S.C. 154(b) by 36 days.

(21) Appl. No.: 10/684,405

(22) Filed: Oct. 15, 2003

(65) Prior Publication Data
US 2004/0099320 A1 May 27, 2004

(30) Foreign Application Priority Data
Nov. 22, 2002 (JP) .............................. 2002-338962

(51) Int. Cl.[7] .......................................... F15B 13/042
(52) U.S. Cl. .............................. 137/625.66; 137/625.69
(58) Field of Search ...................... 137/625.66, 625.69

(56) References Cited

U.S. PATENT DOCUMENTS

| 3,580,287 A | * | 5/1971 | McLaughlin | ........... 137/625.69 |
| 4,540,158 A | * | 9/1985 | Jungen | ........................ 251/367 |
| 4,993,684 A | * | 2/1991 | Prina | ........................... 251/367 |
| 2003/0201020 A1 | * | 10/2003 | Kulmann | ................ 137/625.69 |

FOREIGN PATENT DOCUMENTS

| JP | 8-233132 | 9/1996 |
| JP | 9-229214 | 9/1997 |
| JP | 11-201304 | 7/1999 |
| JP | 11-223267 | 8/1999 |
| JP | 2000-178447 | 6/2000 |
| JP | 2001-41331 | 2/2001 |

* cited by examiner

Primary Examiner—Gerald A. Michalsky
(74) Attorney, Agent, or Firm—Bacon & Thomas

(57) ABSTRACT

A spool valve arrangement with a cylinder is fitted with a clearance fit in a cylinder bore in a housing of the spool valve arrangement. The housing has first pressure medium ports and the cylinder has second pressure medium ports. A socket is inserted through each first pressure medium port in the housing and each second pressure medium port in the cylinder. The socket has a small diameter part, which is fitted with a clearance fit in the second pressure medium port, and a large diameter part, which is engaged with a shoulder formed in the first pressure medium port. By screwing a conduit end in the first pressure medium port, the socket is held in the mounted position, thus providing a seal of the region of this port and also providing an anti-rotation effect on the cylinder relative to the housing.

4 Claims, 4 Drawing Sheets

United States Patent US 6,966,339 B2

SPOOL VALVE ARRANGEMENT

BACKGROUND OF THE INVENTION

1. Field of the Invention

This invention relates to spool valves serving to provide switching operation on pressurized air or like pressure medium and, more particularly, to a spool valve arrangement suited for forming spool valve components from synthetic resin.

2. Description of the Prior Art

A well-known spool valve which has its structural parts formed from synthetic resin, has an arrangement having an injection-molded plastic casing, as disclosed in, for instance, Japanese Patent Laid-Open Publication No. 11-223267. Also, various valve structures including a spool valve constituted by resin parts are disclosed in, for instance, Japanese Patent Laid-Open Publications Nos.11-201304, 9-229214, 8-233132, 2000-178447 and 2001-41331.

The spool valve which has its structural parts formed from synthetic resin, is desired in that compared to the spool valve made of metal, it is possible, owing to weight reduction of the spool, to reduce the pilot pressure using pressurized air or the like for reciprocation, as well as obtaining smooth and quick spool valve switching operation and saving the drive energy. In the mean time, the spool valve mainly comprises a spool, a cylinder which reciprocally accommodates the spool in its spool bore and a housing having a cylinder bore with the cylinder insertedly mounted therein. A spool valve in which the spool and the cylinder are formed from metal, is desired so far as the accuracy of the clearance between the spool and the cylinder can be held within several microns. However, a problem is posed in that foreign particles may enter the clearance, that is, so called foreign particle catch may occur, giving rise to the locking of the spool. By forming the spool and the cylinder from synthetic resin, the above phenomenon of foreign particle catch can be reduced because the clearance is increased to about 40 microns owing to the accuracy concerning the synthetic resin. In a further aspect, a spool valve in which the spool and the cylinder for guiding the spool are formed from metal, usually uses O-rings made of rubber or the like for sealing frictional parts and also use grease coated for improving the sliding. Grease, however, poses a problem in that it may enter discharge air or like pressure medium. For example, where an apparatus to be driven by switching operation of the spool valve is a bellows pump for controlling semiconductor processing liquid, pressure medium contaminated by grease may have adverse effects as oil mist on the purity of the semiconductor processing liquid. Particularly, with an apparatus constituted by a clean room, a serious problem will occur because of contamination of the inside of the apparatus by oil mist introduced into discharge air.

A spool valve which uses ceramics for its material is desired in that it has excellent durability and may have high accuracy. However, a problem is posed in that the material cost is high. Also, this material is weak to shocks, thus giving rise to problems in transport and maintenance. Also, the ceramics are heavy compared to plastics, and a spool valve made of ceramics can difficultly cope with fast operation. Furthermore, since the ceramics are hard, end places to be in contact with the spool at the operation stroke ends are worn greatly, thus giving rise to problems of great stroke end position errors and unstable operation.

A spool valve which uses synthetic resin for its constituent parts, that is, a full resin spool valve, can solve the above problems. This spool valve, however, has the following problems. The cylinder inserted into the cylinder bore of the housing is usually secured by pressure fitting. The pressure fitting of the synthetic resin cylinder, however, results in large deformation, i.e., large deformation of the inner diameter of the cylinder and the inner diameter of the spool valve, giving rise to the possibility of interference with smooth movement of the reciprocated spool in the spool bore. In case of forming two constituent parts from synthetic resins having different linear expansion coefficients, such problem as deformation of the mutually fitted parts due to influence by temperature may arise. To avid this, it may be thought to fit the cylinder by clearance fit in the cylinder bore. In this case, however, a special stopper for preventing rotation of the cylinder relative to the housing is necessary. A further problem resides in that pressure medium leaks greatly via pressure medium ports provided in the housing and the cylinder into the clearance between the housing and the cylinder. This leads to erroneous operation of the spool valve, making it impossible to obtain stable operation.

The invention was made in view of the above various problems inherent in the prior art, and it has an object of providing a spool valve arrangement, which, although its constituent parts are made of synthetic resin, can solve the above problems, permits fast spool operation, can maintain stable operation at low cost, is richly durable and can be readily assembled.

SUMMARY OF THE INVENTION

To attain the above object, according to the invention, a spool valve arrangement is provided, which comprises, as its preamble, a housing having an internal cylinder bore extending along a longitudinal axis and also having a plurality of first pressure medium ports communicated with the cylinder bore to cause flow therethrough of pressurized air or like pressure medium, a conduit end being screwedly mounted in each of the first pressure medium ports, a cylinder insertedly fitted in the cylinder bore of the housing along the longitudinal axis thereof, the cylinder having an internal spool bore extending along the longitudinal axis thereof and also having a plurality of second pressure medium ports communicated with the spool bore and, in the fitted position of the cylinder in the cylinder bore, each of the second pressure medium ports cooperating in such a state of communication with each of the first pressure medium ports of the housing as to form a pressure medium flow passage, a spool reciprocally inserted in the spool bore of the cylinder along the longitudinal axis thereof, and a pilot pressure supplying means for selectively supplying a pilot pressure to the ends of the spool to cause reciprocation thereof in the spool bore, and comprises, as its featuring part, a shoulder formed in the inner periphery of each of the first pressure medium ports of the housing, and a plurality of sockets each having a small diameter part having an outer periphery for detachable fitting in the inner periphery of each of the second pressure medium ports of the cylinder, a large diameter part continuous to the small diameter part and having an outer diameter size capable of being fitted in each of the first pressure medium ports of the housing, the large diameter part having a greater diametrical size than that of the small diameter part, and an internal thorough bore, wherein each of the sockets is inserted into the corresponding first pressure medium port of the housing and also into the corresponding second pressure medium port of the cylinder such that the small diameter part of the socket is fitted in the second pressure medium port of the cylinder and also that the large diameter part of the socket is engaged with the shoulder in the corresponding first pressure medium port of the housing, and wherein with screwed fitting of the conduit end in each of the first pressure medium ports said socket seals the flow passage constituted by the first and second pressure medium ports and prevents the cylinder from rotating relative to the housing.

In the arrangement according to the invention, a plurality of sockets are provided such that it is insertedly fitted in pressure medium ports formed in the housing and the cylinder, respectively. In assembling, each socket is insertedly fitted in the pressure medium ports, and then a conduit end is screwedly mounted therein, so that the socket is held in its inserted position by the conduit end. Thus, the flow passage constituted by the ports is sealed, and also rotation of the cylinder relative to the housing is prevented. By insertedly disposing each socket in the associated pressure medium ports in the above way, it is possible to substantially prevent leaks of the pressure medium through the clearance between the housing and the cylinder and also prevent rotation of the cylinder. These two functions are provided by disposing a single socket.

Also, in the spool valve arrangement according to the invention, the cylinder is insertedly fitted by clearance fit in the cylinder bore of the housing, and also each socket has its small diameter part fitted by clearance fit in each second pressure medium port of the cylinder.

With this arrangement according to the invention, the cylinder can be assembled by clearance fit instead of pressure fitting in the cylinder bore, and the sockets noted above can substantially prevent leaks of the pressure medium through the clearance between the cylinder and the housing. Also, with the sockets each have the small diameter port insertedly fitted by clearance fit in the second pressure medium port of the cylinder, a sufficient seal effect can also be obtained. Where the cylinder and the housing are fitted together by the clearance fit, it is most highly possible that pressure medium passing through the first and second pressure medium ports directly intrudes into and leaks through the boundary region clearance between the cylinder and the housing. However, the sockets are each insertedly mounted such as to seal the boundary region through the first and second pressure medium ports, and thus they can positively prevent the above direct leakage. Besides, the sockets each have the large diameter part held in engagement with the shoulder provided in each first pressure medium port, a seal effect is thus obtained here as well, and it is possible to prevent leaks around each socket to the conduit side. Thus, the above disposition arrangement of the socket can sufficiently prevent anticipated leaks of the pressure medium. Besides, the cylinder can be mounted in the housing without need of adopting the method of securing by pressure fitting, and the sockets themselves can be removably mounted. Thus, it is possible to attain improved readiness of the operation of assembling the whole system in addition to obtaining the seal effects.

Furthermore, in the spool valve arrangement according to the invention, the housing, the cylinder, the spool and the sockets are made of synthetic resin, and particularly the cylinder, the spool and the sockets are made of PEEK (polyetheretherketone) resin.

In the spool valve arrangement according to the invention, the individual component parts are formed from synthetic resin without adopting the method of securing the cylinder by pressure fitting to the housing, the problems in the case of using synthetic resin are solved. As the synthetic resin, PEEK (polyetheretherketone) resin which is presently attracting attention as super-engineering plastics, is thought to be most desirable, and is proposed to be used for the cylinder, the spool and the sockets as component parts. The PEEK resin is low at cost, light in weight and further richly wear-resistant, and thus it can realize operation rate increase and life extension of the spool. As the material of the housing, PP (polypropylene) resin which is far more inexpensive than the PEEK resin may be used to further reduce the cost of the whole spool valve. Compared to the PEEK resin, the PP resin has greater linear expansion coefficient and undergoes greater thermal deformation. However, since the cylinder is fitted by clearance fit in the housing, the thermal deformation of the housing can be absorbed in this clearance part, thus having no adverse effects such as deformation on the internal cylinder.

BRIEF DESCRIPTION OF THE DRAWINGS

The invention will become more apparent upon a reading of the following detailed specification with reference to the accompanying drawings, in which.

DESCRIPTION OF THE PREFERRED EMBODIMENTS

Figure 1:
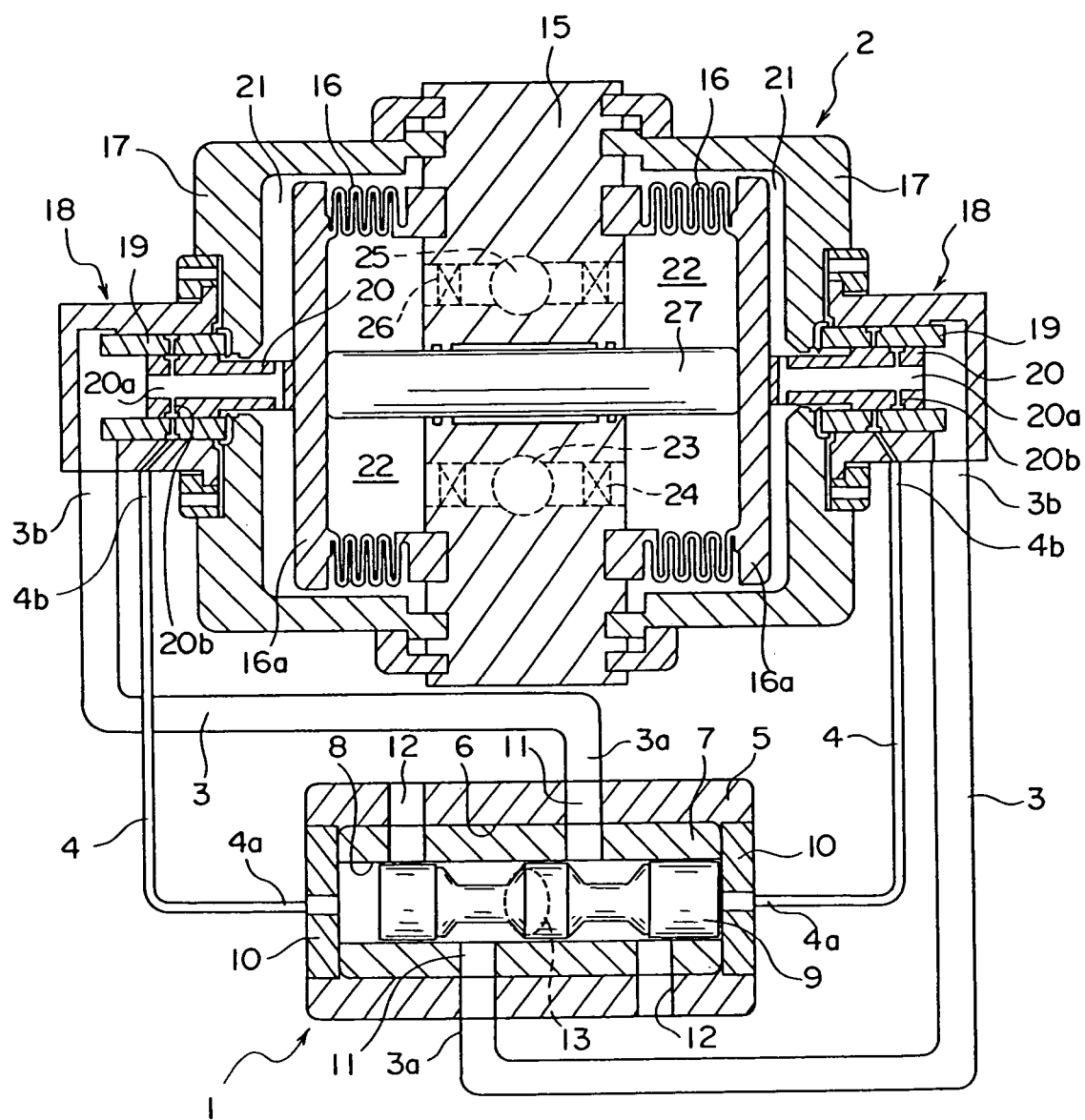
FIG. 1 is a sectional view showing a pump system, in which the spool valve according to the invention is used for switching the operation of a two-bellows pump.

An embodiment of the invention will now be described with reference to the drawings. FIG. 1 shows a pump system, which comprises a spool valve 1 according to the invention, a dual reciprocal bellows pump 2 controlled by the spool valve 1, a pair of pressure medium feeding conduits 3 for feeding pressurized air or like pressure medium, and a pair of pilot pressure conduits 4, the conduits 3 and 4 coupling the spool valve 1 and the bellows pump 2 to each other.

Figure 3:
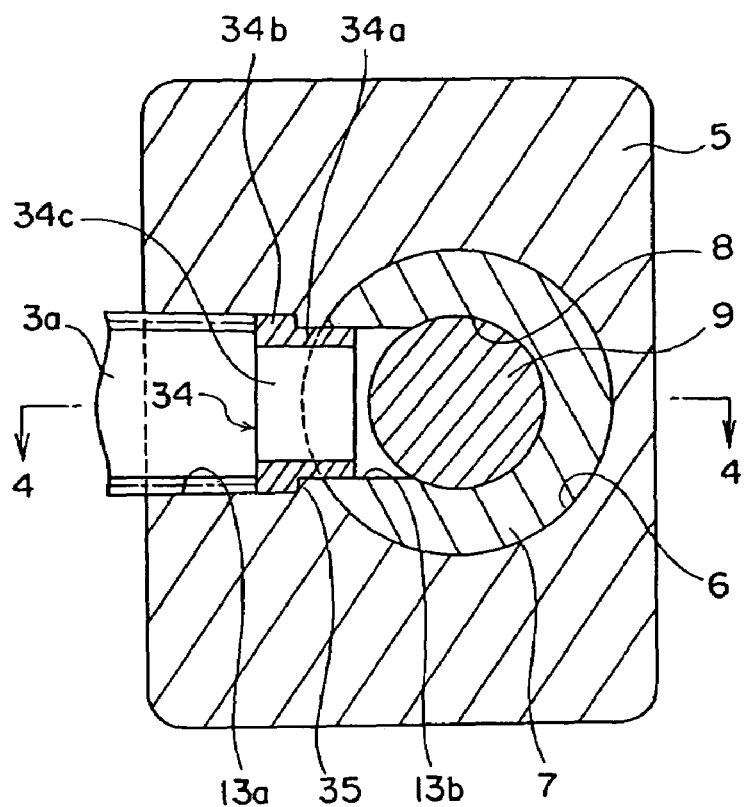
FIG. 3 is a sectional view taken along line 3—3 in FIG. 2.
Figure 4:
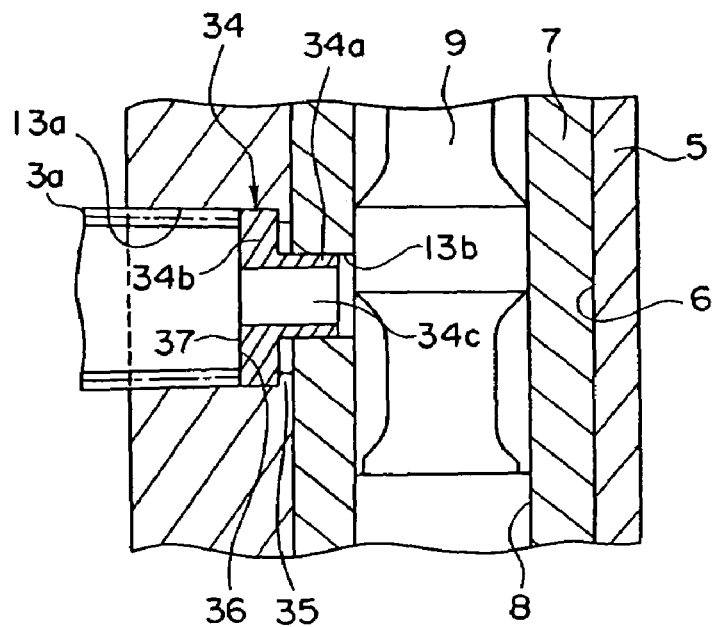
FIG. 4 is a fragmentary sectional view taken along line 4—4 in FIG. 3.

The spool valve 1 includes a housing 5, a cylinder 7 insertedly mounted in a cylinder bore 6 formed in the housing 5, a spool 9 reciprocally insertedly mounted in a spool bore 8 formed in the cylinder 7, and caps 10, as end member of the cylinder 7, closing the opposite ends of the spool 9 and the cylinder 7. The pair pressure medium feeding conduits 3 each have one end 3a coupled to each pressure medium port 11 of the spool 11, and the pair of pilot pressure ports 4 each have one end 4a coupled to each cap 10 for selectively applying a pilot pressure to the spool 9. Reference numeral 12 designates pressure medium discharge ports, and numeral 13 designates a pressure medium inlet port for introducing pressure medium into the spool valve 1. In FIG. 1, the pressure medium inlet port 13 is shown shaded. This port 13 is connected via other conduit (not shown) to a pressure medium source such as a compressor (not shown). The conduit 3 has one end 3a screwedly mounted in the port 13 (FIGS. 3 and 4).

The dual reciprocal bellows pump 2 includes a pump head 15, pump housings 17 each disposed on each side of the pump head 15 and internally accommodating a bellows 16, and switching mechanisms 18 each mounted on each housing 17 and coupled to the other end 3b of each pressure medium feeding conduit 3 and also to the other end 4b of each pilot pressure conduit 4 constituting a pilot pressure applying means, for switching the operations of a pair of bellows 16 in response to the switching operation of the spool valve 1.

Each switching mechanism 18 has a cylinder 19 and a piston 20. The piston 20 has an axial bore 20a for passing pressure medium therethrough and a lateral hole 20b for passing a pilot pressure therethrough, and it extends into a pressure medium operation chamber 21 and is positioned to be in contact with an end member 16a of an associated bellows 16. The axial bore 20b is in communication with the associated operation chamber 21. The lateral hole 20b is in communication with the associated pilot pressure conduit 4 with the piston 20 at the left side piston position in FIG. 1, and when the piston position is deviated as shown by the position of the right side piston, its communication with the associated pilot pressure conduit 4 is cut off. The pilot pressure is obtained by branching part of the pressure medium to the pilot pressure conduit 4.

Pumped fluid such as a semiconductor processing fluid is fed from a suction port 23 provided in the pump head 15 via uni-directional valves 24 also provided therein to the pump chambers 22 formed in the pair bellows 16, and is fed out from the pump chambers 22 via uni-directional valves 26 provided in the pump head 16 to a discharge port 25 also provided therein. The two bellows 16 are reciprocally moved in an interlocked relation to an interlock shaft 27 slidably inserted in the pump head 15.

In the pump system shown in FIG. 1, a pilot pressure which is selectively fed via the air pilot pressure conduits 4 to the spool valve 1, has an effect of selectively moving the spool 9 in the spool valve 1 along the longitudinal axis X—X (FIG. 2) of the cylinder 7. As a result, the pair pressure medium ports 11 are selectively brought into communication with the pressure medium inlet port 13, whereby pressure medium is fed via the associated pressure medium feeding conduit 3 and switching mechanism 18 to the associated pressure medium operation chamber 21. This has an effect of compressing the associated bellows 16 and causing the pumped fluid in the pump chamber 22 in this bellows to be discharged from the discharge port 25. In an interlocked relation to this operation, pumped fluid is fed via the suction port 23 to the other pump chamber 22.

In the above way, the pumping operation with reciprocation of the pair bellows 16 is continuously executed by the switching operation of the spool valve 1.

The arrangement of the spool valve 1 according to the invention will now be described in greater details with reference to FIG. 2. The cylinder 7 which is insertedly fitted in the cylinder bore 6 of the housing 5 along the longitudinal axis X—X is held in the illustrated mounted position, which is prescribed with one end of it in contact with an annular stopper 31 formed in the cylinder bore 6. In this state, a cap 10a is screwedly secured to the housing 5, and the other end of the cylinder 7 is closed via a ring-like spacer 32. Another cap 10b is likewise screwedly secured to the housing 5, whereby one end of the cylinder 7 is closed via the ring-like spacer 32. After the cylinder 7 has been accommodated together with the spool 9 in the housing 5, the left and right caps 10a and 10b are screwed onto the housing 5 to close the ends of the cylinder 7.

Figure 2:
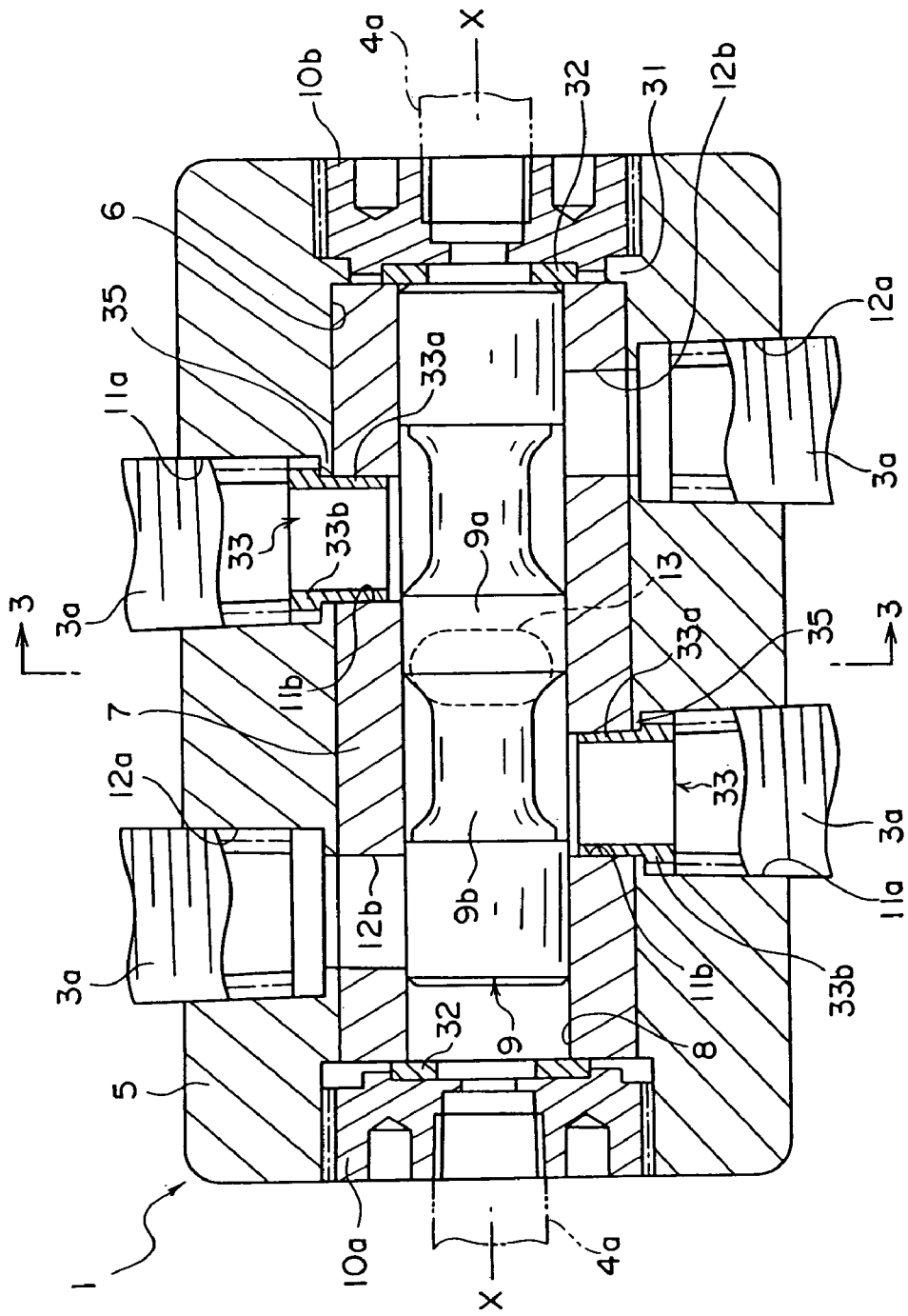
FIG. 2 is a sectional view showing the spool valve according to the invention.

As shown in FIG. 2, the pressure medium ports 11 as shown in FIG. 1, are each constituted by a cylindrical first pressure medium port 11a penetrating the housing 5 and having a female thread and a small-diameter cylindrical second pressure medium port 11b penetrating the cylinder 7 at the corresponding position thereof. Likewise, as shown in FIG. 2, the pressure medium discharge ports 12 as shown in FIG. 1, are each constituted by a cylindrical first pressure medium port 12a for discharge penetrating the housing 5 and having a female thread and a small-diameter cylindrical second pressure maximum port 12b formed in the cylinder 7 at the corresponding position thereof. As shown in FIGS. 3 and 4, the pressure medium inlet port 13 as shown in FIG. 1, is constituted by a cylindrical first pressure medium port 13a for introducing a pressure medium, which is formed by penetrating the housing 5 and has a female thread, and an elliptical or oval second pressure medium port 13b penetrating the cylinder 7 at the corresponding position thereof. The above ports all mean the pressure medium port according to the invention.

In the assembling, the cylinder 7 inserted in the housing 5 is turned about the axis X—X for angle adjustment to align the first pressure medium ports 11a, 12a and 13a of the housing 5 and the second pressure medium ports 11b, 12b and 13b of the cylinder 6 to one another, whereby the associated ports are communicated with each other and cooperate to form pressure medium passages. In this states, sockets 33 and 34 are inserted in the pressure medium feeding ports 11a and 11b and the pressure medium inlet ports 13a and 13b.

The sockets 33 and 34 each have a small diameter part 33a or 34a having an outer periphery for detachable fitting in the inner periphery of the associated second pressure medium port 11b or 13b of the cylinder 7 and a cylindrical large diameter part 33b or 34b continuous to the small diameter part 33a and 34a and having an outer diameter size capable of being fitted in the associated pressure medium port 11a and 13a of the housing 5, the large diameter part having a greater diametrical size than that of the small diameter part, and an internal thorough bore 33c or 34c.

The small diameter part 33a of each socket 33 is cylindrical and has an outer diameter corresponding to that of each second pressure medium port 11b of the cylinder 7. The small diameter part 34b of the socket 34, as shown in FIGS. 3 and 4, is elliptical or oval corresponding in shape to the second pressure medium port 13b of the cylinder 7.

The first pressure medium ports 11a and 13a of the housing 5 each have the inner periphery formed at a position adjacent to the inner end, i.e., at a position adjacent to the second pressure medium port 11b or 13b, with an annular shoulder 35. When the sockets 33 and 34 are inserted, their large diameter parts 33b and 34b are each brought into engagement with the corresponding shoulder 35. With the sockets 33 and 34 in the above inserted state, an end 3a of a conduit 3 is externally screwedly mounted and secured in each of the first pressure medium ports 11a and 13a. At this time, a ring-like or annular end face of the end 3a is held in contact with a ring-like or annular end face 37 (FIG. 4) of each of the large diameter parts 33b and 34b of the sockets 33 and 34. The sockets 33 and 34 are thus reliably held in their inserted positions, that is, they are each held in the immovable state in the associated or corresponding pressure medium port. Thus, leaks of the pressure medium are prevented, and the pressure medium flow passages formed by the ports 11a and 11b, and 13a and 13b are sufficiently sealed. In this state, leaks around the sockets 33, 34 to the conduit side are not possible since a seal effect is obtained with the engagement between the large diameter part 33b, 34b of each socket 33, 34 held in the inserted position and the associated shoulder 35.

Most anticipated pressure medium leaks are those though a boundary clearance 38 (FIG. 5) between the housing 5 and the cylinder 7. However, since the part of the clearance 38 is blocked by the sockets 33 and 34, it is possible to avoid direct flow of pressure medium into the clearance 38. The possibility of leaks into the clearance 38 is limited to the case of possible leaks through the small diameter parts 33a and 34a of the sockets 33 and 34 and the second pressure medium ports 11b and 13b of the cylinder 7 to reach the clearance 38. However, since the direct flow from the pressure medium passages can be avoided, it is possible to sufficiently hold leaks, if any, within the permissible range in the spool valve operation.

Thus, it is possible to adopt an arrangement for insertedly fitting the cylinder 7 not by pressure fitting but by clearance fit in the cylinder bore 6 of the housing 5. Also, it is possible to adopt an arrangement for fitting the small diameter parts 33a and 34a of the sockets 33 and 34 by clearance fit in the associated second pressure medium ports 11b and 13b.

With the arrangement of fitting by clearance fit adopted as in the above, the sockets 33 and 34 prevent the cylinder from rotating about the axis X—X shown in FIG. 1 relative to the housing 5. This is so because the anti-rotation effect with respect to the cylinder 7 is obtainable owing to the arrangement for fitting the small diameter parts 33a and 34a of the sockets 33 and 34 in the inner periphery of the associated second pressure medium ports 11b and 13b. That is, the sockets 33 and 34 attains two functions of preventing pressure medium leaks and preventing rotation of the cylinder 7.

Figure 5:
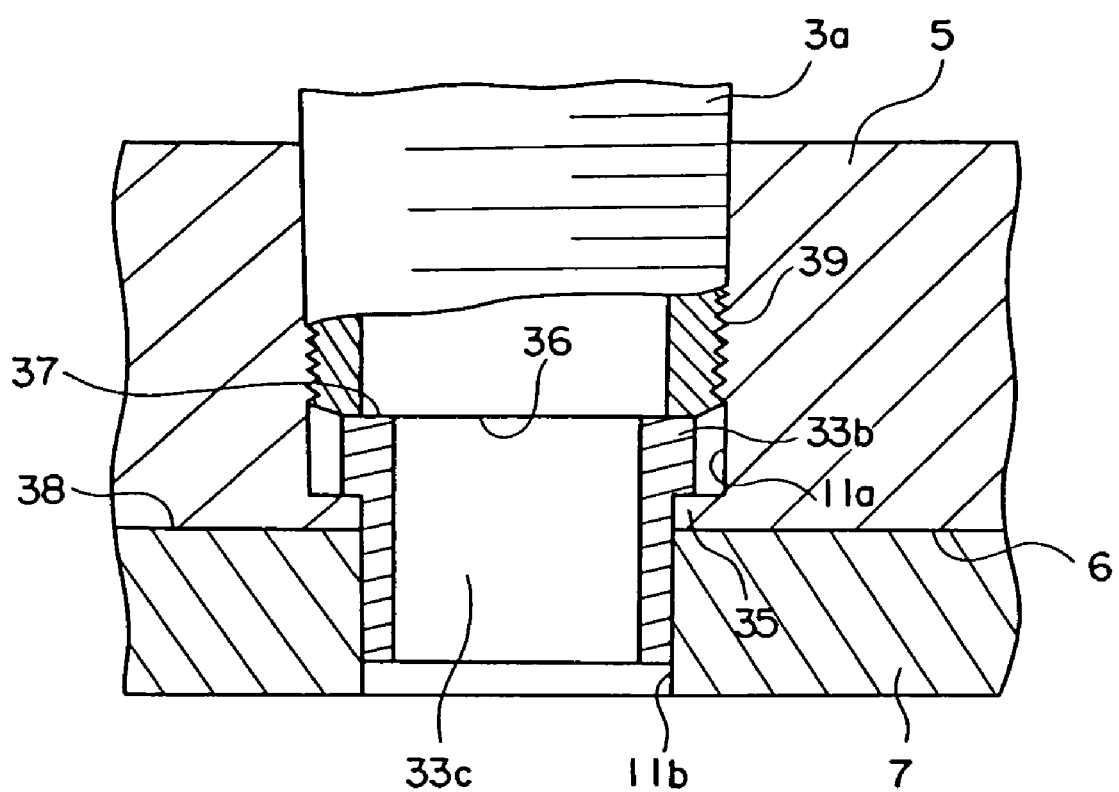
FIG. 5 is a fragmentary enlarged sectional view showing a part with a socket mounted therein as shown in FIG. 2.

As shown in FIG. 5, the inner periphery of each first pressure medium port 11a of the housing 5 is formed with a female thread 39, in which the associated or corresponding conduit end 3a is screwed. As the conduit end 3a, a usual conduit joint is used.

Referring to FIG. 2, in the first and second pressure medium ports 12a and 12b for pressure medium discharge, the conduit ends 3a are mounted without inserted fitting of any socket. This is so because the ports 12a and 12b are provided for discharge, and leaks of pressure medium in these ports have no particular adverse effect on the spool valve operation. However, it is of course possible to insertedly fit the sockets 33, 34 in the ports 12a and 12b.

The spool 9 has a structure having sealing parts 9a in sliding contact with the inner periphery of the cylinder bore 8 and communication parts 9b forming annular grooves for communication with pressure medium, the parts 9a and 9b being alternately formed to one another, and the spool 9 is not different from the usual spool structure. In this embodiment, the port 13 for pressure medium introduction has an elliptical or oval shape as shown to have its width along the axis X—X corresponding to the width of the sealing parts 9a of the spool 9.

As for the materials used for the component parts of the spool valve 1 according to the invention, the housing 5, the cylinder 7, the spool 9 and the sockets 33 and 34 may all be made of synthetic resin. Particularly, the cylinder 7, the spool 9 and the sockets 33 and 34 are desirably made of PEEK (polyetheretherketone) resin. The PEEK resin is low at cost, light in weight and richly wear-resistant and can realize operation rate increase and life extension of the spool. Aside from the PEEK resin, it is possible to also adopt like synthetic resins such as PPS (polyphenylene sulfide) resin. It is possible to use the PEEK resin or like synthetic resins for other component parts of the spool valve, for instance the spacer 32. As the material of the housing 5, such inexpensive synthetic resins as PP (polypropylene) resin can be used. In this case, if the housing 5 which has a different linear coefficient of expansion from that of the resin used for internal cylinder 7, is thermally deformed, the deformation is absorbed by the clearance part of the clearance fit, and thus has no possibility of having adverse effects on the cylinder 7 such as deformation thereof. It is thus possible to maintain the accuracy with respect to the spool 9 which is reciprocated in the cylinder 7 and positively prevent such operation failure as the locking of the spool 9.

As described before, in the assembling of the spool valve 1 according to the invention, the cylinder 7 can be insertedly fitted by clearance fit in the cylinder bore 6 of the housing 5, and also the sockets 33, 34 can be detachably insertedly mounted in the associated pressure medium ports 11 and 13. Thus, the assembling operation can be very readily made. Also, since the pressure fitting method is not adopted, it is not possible that the component parts undergo deformation.

While an embodiment of the spool valve according to the invention has been described, the described arrangement is by no means limitative. For example, in the above embodiment, the sockets 33 and 34 are provided with small diameter parts 33a and 34a and the large diameter parts 33b and 34b, while the first pressure medium ports 11a and 13a are each provided with the shoulder 35 for engagement with each of the large diameter parts 33b and 34b. However, it is also possible to form the sockets such that they have a tapered outer shape, while forming the shoulder formed in, for instance, each first pressure medium port to have a corresponding tapered shape. That is, the shape of the shoulder 35 is not limited to the rectangular shape as in the embodiment, but it maybe a different shape such as a tapered shape.

As has been described in the foregoing, the sockets are insertedly fitted in the pressure medium ports formed in the housing and the cylinder, and in this state they are held in the insertedly fitted position by the conduit ends screwed in the ports. Thus, the flow passages of the ports are sealed, and also rotation of the cylinder relative to the housing is prevented. That is, the two functions of preventing pressure medium leaks and providing the anti-rotation effect with respect to the cylinder can be obtained at a time, and this permits readily forming the component parts of the spool valve from synthetic resin without adopting the method of mounting the cylinder by pressure fitting in the cylinder bore. Also, this arrangement has various other effects such as manufacturing cost reduction and life extension of the spool valve and also realizing spool operation rate increase.

What is claimed is:

1. In a spool valve arrangement comprising:
   a housing having an internal cylinder bore extending along a longitudinal axis and also having a plurality of first pressure medium ports communicated with the cylinder bore to cause flow therethrough of pressurized air or like pressure medium, a conduit end being screwedly mounted in each of the first pressure medium ports;
   a cylinder fitted in the cylinder bore of the housing along the longitudinal axis thereof, the cylinder having an internal spool bore extending along the longitudinal axis thereof and also having a plurality of second pressure medium ports communicated with the spool bore and, in the fitted position of the cylinder in the cylinder bore, each of said second pressure medium ports cooperating in such a state of communication with each of the first pressure medium ports of the housing as to form a pressure medium flow passage;
   a spool reciprocally inserted in the spool bore of the cylinder along the longitudinal axis thereof; and a pilot pressure applying means for selectively applying a pilot pressure to the ends of the spool to cause reciprocation thereof in the spool bore;

a shoulder formed in the inner periphery of each of the first pressure medium ports of the housing; and a plurality of sockets each having a small diameter part having an outer periphery for detachable fitting in the inner periphery of each of said second pressure medium ports of the housing, a large diameter part continuous to the small diameter part and having an outer diameter size capable of being fitted in each of said first pressure medium ports of the housing, the large diameter part having a greater diametrical size than that of the small diameter part, and an internal thorough bore;

wherein each of the sockets is inserted into the corresponding first pressure medium port of the housing and also into the corresponding second pressure medium port of the cylinder such that the small diameter part of the socket is fitted in the corresponding second pressure medium port of the cylinder and also that the large diameter part of the socket is engaged with the shoulder in the corresponding first pressure medium port of the housing, and wherein with screwed fitting of the conduit end in each of the first pressure medium port said socket seals said pressure medium flow passage formed by said first and second pressure medium ports and prevents the cylinder from rotating relative to the housing.

2. The spool valve arrangement according to claim 1, wherein the housing, the cylinder, the spool and the sockets are made of synthetic resin, and particularly the cylinder, the spool and the sockets are made of polyetheretherketone resin.

3. The spool valve arrangement according to claim 1, wherein the cylinder is fitted by clearance fit in the cylinder bore of the housing, and the small diameter part of each socket is fitted by clearance fit in the corresponding second pressure medium port of the cylinder.

4. The spool valve arrangement according to claim 3, wherein the housing, the cylinder, the spool and the sockets are made of synthetic resin, and particularly the cylinder, the spool and the socket are made of polyetheretherketone resin.

* * * * *